United States Patent
Dagli

(10) Patent No.: US 9,470,952 B2
(45) Date of Patent: Oct. 18, 2016

(54) SUB-VOLT DRIVE 100 GHZ BANDWIDTH ELECTRO-OPTIC MODULATOR

(71) Applicant: The Regents of the University of California, Oakland, CA (US)

(72) Inventor: Nadir Dagli, Goleta, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/891,934

(22) PCT Filed: Jun. 12, 2014

(86) PCT No.: PCT/US2014/042154
§ 371 (c)(1),
(2) Date: Nov. 17, 2015

(87) PCT Pub. No.: WO2014/201269
PCT Pub. Date: Dec. 18, 2014

(65) Prior Publication Data
US 2016/0139486 A1 May 19, 2016

Related U.S. Application Data

(60) Provisional application No. 61/834,788, filed on Jun. 13, 2013.

(51) Int. Cl.
*G02F 1/225* (2006.01)
*G02F 1/017* (2006.01)
(Continued)

(52) U.S. Cl.
CPC ............ *G02F 1/2257* (2013.01); *G02B 6/125* (2013.01); *G02B 6/132* (2013.01); *G02F 1/0121* (2013.01); *G02F 1/01708* (2013.01); *G02F 1/025* (2013.01); *G02B 2006/1204* (2013.01);
(Continued)

(58) Field of Classification Search
CPC ............... G02F 1/0121; G02F 1/2257; G02F 2201/12; G02F 2202/20; G02F 2202/42; G02B 6/125; G02B 6/132; G02B 2006/1204; G02B 2006/12047; G02B 2006/12054; G02B 2006/12078; G02B 2006/12128; G02B 2006/12142; G02B 2006/12159
USPC ................................ 385/1–10, 14, 129–132
See application file for complete search history.

(56) References Cited

U.S. PATENT DOCUMENTS

| | | |
|---|---|---|
| 2002/0110302 A1 | 8/2002 | Gopalakrishnan |
| 2005/0123242 A1 | 6/2005 | Walker et al. |

(Continued)

OTHER PUBLICATIONS

World Intellectual Property Organization, International Preliminary Report on Patentability for Application No. PCT/US2014/42154, Mail Date Dec. 23, 2015.

(Continued)

*Primary Examiner* — Akm Enayet Ullah
*Assistant Examiner* — Michael Mooney
(74) *Attorney, Agent, or Firm* — SoCal IP Law Group LLP; Mark A. Goldstein; John E. Gunther

(57) ABSTRACT

Electro-optical modulators and methods of fabrication are disclosed. An electro-optical modulator includes a Mach-Zehnder interferometer formed in a substrate removed semiconductor layer and a coplanar waveguide. Signals from the coplanar waveguide are capacitively coupled to the Mach-Zehnder interferometer through first and second dielectric layers having strong dielectric constant dispersion.

20 Claims, 8 Drawing Sheets

(51) Int. Cl.
  *G02B 6/132* (2006.01)
  *G02B 6/125* (2006.01)
  *G02F 1/01* (2006.01)
  *G02F 1/025* (2006.01)
  *G02B 6/12* (2006.01)
  *G02F 1/21* (2006.01)

(52) U.S. Cl.
  CPC ........ *G02B 2006/12047* (2013.01); *G02B 2006/12054* (2013.01); *G02B 2006/12078* (2013.01); *G02B 2006/12128* (2013.01); *G02B 2006/12142* (2013.01); *G02B 2006/12159* (2013.01); *G02F 2001/212* (2013.01); *G02F 2201/12* (2013.01); *G02F 2202/20* (2013.01); *G02F 2202/42* (2013.01)

(56) References Cited

U.S. PATENT DOCUMENTS

| | | |
|---|---|---|
| 2005/0254743 A1 | 11/2005 | Akiyama et al. |
| 2007/0280580 A1 | 12/2007 | Shiraishi et al. |
| 2008/0069491 A1 | 3/2008 | Kissa et al. |
| 2009/0041403 A1* | 2/2009 | Kawano ............ G02F 1/0121 385/3 |

OTHER PUBLICATIONS

USPTO, International Search Report and Written Opinion for Application No. PCT/US2014/42154, Mail Date Oct. 24, 2014.

* cited by examiner

SUB-VOLT DRIVE 100 GHZ BANDWIDTH ELECTRO-OPTIC MODULATOR

RELATED APPLICATION INFORMATION

This application is a National Stage Application filed under 35 U.S.C. 371 and claims the benefit of priority to Patent Cooperation Treaty Application No.: PCT/US2014/042154 filed Jun. 12, 2014, which claims benefit of priority from U.S. Provisional Patent Application No. 61/834,788, filed Jun. 13, 2013, titled SUB-VOLT DRIVE 100 GHZ BANDWIDTH ELECTRO-OPTIC MODULATOR. The full contents of the International Patent Application are incorporated herein by reference.

GOVERNMENT INTERESTS

This invention was made with Government support under Grant No. 08ST1-0221 awarded by Defense Advanced Research Projects Agency-Small Business Technology Transfer Program. The Government has certain rights in the invention.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical modulators for application in fiber optic communications systems and other electro-optic systems.

2. Description of the Related Art

Optical modulators are essential components for fiber optic communication, RF photonics, instrumentation and optical signal processing applications. Desired characteristics of optical modulators are a modulation bandwidth as high as possible while maintaining a drive voltage as low as possible. Usually achieving these two properties requires conflicting sets of design rules. For example ultra-low drive voltage can be achieved using substrate removed (SURE) waveguides (JaeHyuk Shin, Yu-Chia Chang, and Nadir Dagli, "0.3 V drive GaAs/AlGaAs substrate removed Mach-Zehnder intensity modulators," Appl. Phys. Letters, vol. 92, 201103, 2008). SURE waveguides are formed in a semiconductor epitaxial layer that is removed from its original substrate. Both sides of the epitaxial layer can be processed, enabling very novel designs. Such submicron thick waveguides have very high vertical index contrast and can guide the optical wave with very low loss of about a few dB/cm (JaeHyuk Shin, Yu-Chia Chang, and Nadir Dagli, "Propagation loss study of very compact GaAs/AlGaAs substrate removed waveguides," Optics Express, Vol. 171, No. 5, 2009). However metal electrodes cannot be used on such waveguides since overlap of the optical mode with the metal typically results in excessive optical propagation loss. This difficulty is circumvented using doped semiconducting layers as buried electrodes. Therefore very strong electric fields overlapping very well with optical mode in the waveguide can be generated. resulting in ultra-low drive voltage. However finite sheet resistance of the doped semiconductor layers may create excessive resistance and electrode loss which in turn limits the bandwidth of the modulator to about 30 GHz (Selim Dogru, JaeHyuk Shin and Nadir Dagli, "Wide Bandwidth Design of Ultra-Low Voltage Substrate-Removed Electro-Optic Mach-Zehnder Intensity Modulators," Integrated Photonics and Nanophotonics Research Conference Proceedings, Paper IWA6, Honolulu, Hi., Jul. 12-17, 2009; Selim Dogru, Jae Hyuk Shin and Nadir Dagli, "Traveling Wave Electrodes for Substrate Removed Electrooptic Modulators with Buried Doped Semiconductor Electrodes" IEEE J. Quantum Electron., vol. 49, No. 7, pp. 599-606, July 2013).

DETAILED DESCRIPTION

Description of Apparatus

A novel design for an ultra-wide bandwidth very low drive voltage modulator is presented. This design combines buried electrodes made of doped semiconductors and dielectrics with very large dielectric constant dispersion. This approach bypasses the bandwidth limit due to large electrode loss originating from buried electrodes at microwave frequencies while allowing very low drive voltage due to much reduced electrode gap resulting from buried electrodes. A device with 0.4 volt or less operating voltage and bandwidth exceeding 100 GHz is possible.

Figure 1:
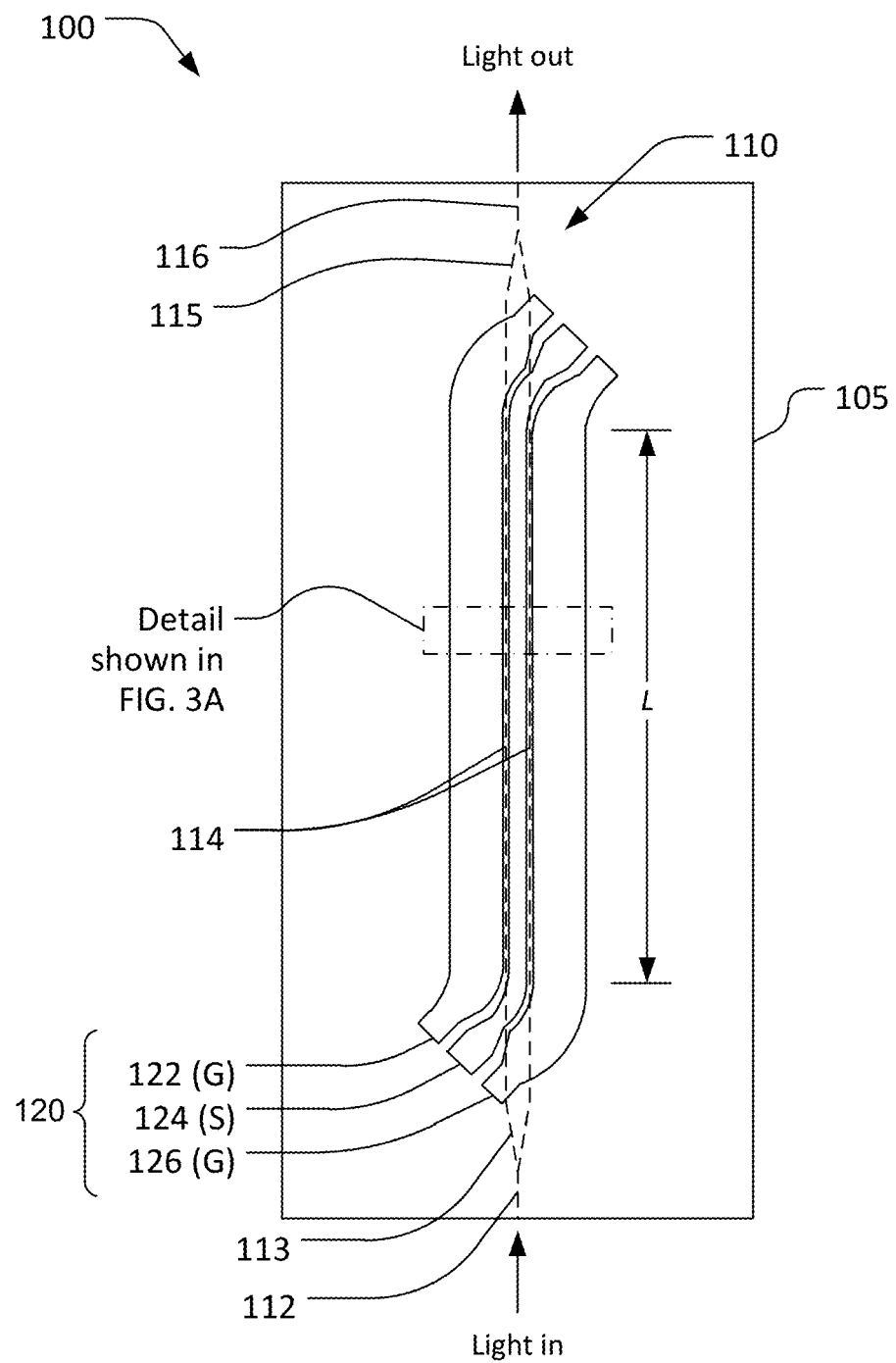
FIG. 1 is a plan view of an electro-optic modulator.

Referring now to FIG. 1, an ultra-wide bandwidth very-low drive voltage modulator 100 may include a Mach-Zehnder interferometer 110 fabricated on a substrate 105. A Mach-Zehnder interferometer is a well-known waveguide device comprised of an input optical waveguide 112, a splitter 113, two branch optical waveguides 114, a combiner 115, and an output optical waveguide 116. The optical waveguides 112-116 are shown as dashed lines in FIG. 1. All optical waveguides 112-116 support a single propagating mode. Light coupled into the input optical waveguide 112 is divided between the two branch optical waveguides 114 by the y-branch splitter 113, which could also be a directional coupler or a multi-mode interference coupler. After transiting the two branch optical waveguides 114, the light is recombined and directed into the output optical waveguide 116 by the y-branch combiner 115 which could also be a directional coupler or a multi-mode interference coupler. The light is delayed or phase-shifted by the transit along the two branch optical waveguides 114. When the phase shifts in the two branch optical waveguides 114 are equal, a maximum amount of light is directed into the output optical waveguide 116 (i.e., 100% less any losses inherent in the waveguides). When the phase shift between the two branch optical waveguides 114 is 180 degrees, the light from the two branch optical waveguides 114 interferes at the combiner 115, and little light is directed into the output optical waveguide 116.

A Mach-Zehnder interferometer may be fabricated on an electro-optical material, which is to say a material where the index of refraction can be varied by applying an electric field. When a Mach-Zehnder interferometer, such as the Mach-Zehnder interferometer 110, is used as a modulator, a time-varying electric field may be applied to one or both of the two waveguide branches to vary the index of refraction of the waveguide branches. Varying the index of refraction changes the phase shift incurred by light transiting the waveguide branches, and thus modulates the amount of light coupled into the output waveguide.

In the ultra-wide bandwidth very-low drive voltage modulator 100, electric fields are applied to the two branch optical waveguides 114 by a coplanar transmission line 120 superimposed on the Mach-Zehnder interferometer. The coplanar transmission line 120 includes a signal trace 124 (S) between two ground traces 122, 126 (G). A microwave signal introduced at one end of the coplanar transmission line 120 will propagate along the waveguide to the other end. Commonly, the signal may then be dissipated in a load (not shown) that matches the impedance of the coplanar waveguide. A coplanar strip can also be used in place of the coplanar transmission line.

The ultra-wide bandwidth very-low drive voltage modulator 100 as an example of what is commonly called a traveling wave modulator, since the light exiting the Mach-Zehnder interferometer is modulated by an electric wave as the wave travels down the coplanar transmission line. In order to effect maximum modulation of the light, the propagation velocity of the microwave signal in the coplanar transmission line 120 needs to be the same as the propagation velocity of the light in the branch optical waveguides 114.

The ultra-wide bandwidth very-low drive voltage modulator 100 may be formed in a substrate removed compound semiconductor layer. In this patent, a "substrate removed semiconductor layer" is a semiconductor layer that is attached to a supporting substrate by an adhesive, as opposed to a semiconductor layer that is grown on, or deposited directly on, a substrate. The adhesive may be, for example, Benzocyclobutane (BCB) or another polymer material. The substrate removed compound semiconductor layer may be initially created as an epitaxial layer on a substrate, and then removed from the substrate and glued onto a transfer substrate using a glue such as BCB. Details of the transfer and substrate removal processes will be provided subsequently.

Figure 2:
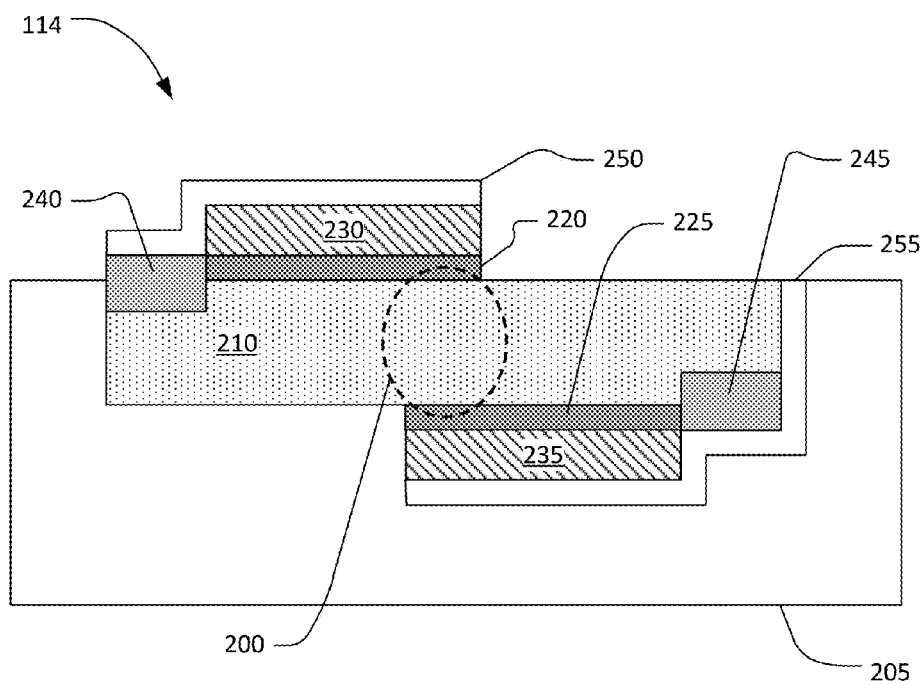
FIG. 2 is a cross-sectional schematic view of one optical waveguide of the electro-optic modulator.

FIG. 2 shows a schematic cross-section view of one of the branch optical waveguides 114 of the Mach Zehnder interferometer 110. The optical waveguide 114 may include a central intrinsic (i) layer 210 composed of InAlAs/InAlGaAs multi quantum wells (MQWs). The central i-layer 210 may also be any other material having an electro-optic effect, such as GaAs, InP, Si or other compound semiconductor MQWs. The central i-layer 210 may be sandwiched between a p-doped layer 220 and an n-doped layer 225. The p-doped layer 220 and the n-doped layer 225 may be, for example, InP or other suitable p and n doped compound semiconductor or silicon layers. The p-doped layer 220, the central i-layer 210, and the n-doped layer 225 form a p-i-n diode. The positions of the p and n doped layers 220, 225 may be interchanged. In other words 220 could be the n doped layer and 225 could be the p doped layer.

The p-doped layer 220, the central i-layer 210, and the n-doped layer 225 also form a so-called "staircase waveguide" 200 (indicated by the dashed oval) in a region where the p-doped layer 220 and the n-doped layer 225 overlap. A similar staircase waveguide may also be formed using other electro-optic materials such as bulk GaAs, InP or Si. A staircase waveguide is similar to a rib waveguide but each side of the rib is etched on opposite sides of the substrate removed semiconductor layer. The staircase waveguide may support a single mode waveguide at a wavelength of operation of the ultra-wide bandwidth very-low drive voltage modulator 100. The single optical mode will have a Gaussian-like electric field distribution and will not be precisely confined within the waveguide 200.

The refractive index of the central i-layer 210 (and thus the phase shift of light propagating along the waveguide 200) may be varied by applying an electric field across the a p-i-n diode formed by the p-doped layer 220, the central i-layer 210, and the n-doped layer 225. Electrical connections may be made to the p-doped layer 220 and the n-doped layer 225 by a first ohmic contact 240, and a second ohmic contact 245 on the sides of the waveguide away from the optical mode. However, when a microwave modulating signal is applied between the ohmic contacts 240, 245, AC currents will still flow laterally through the p-doped layer 220 and the n-doped layer 225. The resistance of the p-doped layer 220 and the n-doped layer 225 and the capacitance of the central i-layer 210 will, in over simplified terms, form a low pass filter that may limit the bandwidth of ultra-wide bandwidth very-low drive voltage modulator 100 due to attenuation of the microwave signal from resistive losses in the p-doped layer 220 and the n-doped layer 225.

To increase the bandwidth of the ultra-wide bandwidth very-low drive voltage modulator 100, first and second metal conductors 250, 255 may extend respectively from the first and second ohmic contacts 240, 245. The first and second metal conductors 250, 255 may overlap the p-doped layer 220 and the n-doped layer 225 respectively. However, to avoid attenuation of the optical mode traveling in the waveguide 200, the optical mode should not overlap the first and second metal conductors 250, 255 or the first and second ohmic contacts 240, 245. Thus the first and second metal conductors 250, 255 may be separated from the p-doped layer 220 and the n-doped layer 225 by respective first and second dielectric layers 230, 235. The thickness of the first and second dielectric layers 230, 235 may be sufficient to ensure that the first and second metal conductors 250, 255 do not overlap the optical mode. The first and second metal conductors 250, 255 may be capacitively coupled to the p-doped layer 220 and the n-doped layer 225 through the respective first and second dielectric layers 230, 235.

The first and second dielectric layers 230, 235 between first and second metal conductors 250, 255 and the p-doped and n-doped layers 220, 225 may be made from a dielectric material having a high dielectric constant at microwave and millimeter wave frequencies but a low refractive index at optical frequencies. A high dielectric constant at microwave and millimeter wave frequencies may ensure strong AC coupling from the first and second metal conductors 250, 255 to the p-doped and n-doped layers 220, 225. The use of a dielectric material with a low dielectric constant and correspondingly low index of refraction at optical frequencies may assist in confining the optical mode such that the optical mode does not overlap the first and second metal conductors 250, 255 or the first and second ohmic contacts 240, 245. To confine the optical mode, the index of refraction of the first and second dielectric layers 230, 235 may be lower than the index of refraction of the central i-layer 210 and less than the index of refraction of the p-doped and n-doped layers 220, 225. (about 3.1 at 1.55 microns).

For example, a central i-layer 210 composed of InAlAs/InAlGaAs multi quantum wells will have an index of refraction about 3.5 at a wavelength of 1.55 microns. InP p-doped and n-doped layers 220, 225 will have an index of refraction about 3.1 at 1.55 microns.

The refractive index n of a material is given by the following equation:

$$n=\sqrt{\epsilon_r \mu_r}$$

where $\epsilon_r$ is the relative permittivity or dielectric constant of the material and $\mu_r$ is the relative permeability of the material. For non-magnetic material, $\mu_r$ is very close to 1.0. Thus the relationship between dielectric constant and refractive index of the dielectric layers 230, 235 may be given by $$n=\sqrt{\epsilon_r} \text{ or } \epsilon_r=n^2.$$

The first and second dielectric layers 230, 235 may be a dielectric material having strong dielectric constant dispersion, which is to say the dielectric constant of the material at microwave and millimeter frequencies may be substantially larger than the square of the refractive index of the material at optical frequencies. A dielectric material is considered to have strong dielectric constant dispersion if the following equation is satisfied:

$$\epsilon_{r\mu}>5n_o^2,$$

where $\epsilon_{r\mu}$ is the dielectric constant of the material at a microwave frequency of operation of ultra-wide bandwidth very-low drive voltage modulator 100 and $n_o$ is the index of refraction for an optical wavelength of operation of the ultra-wide bandwidth very-low drive voltage modulator 100.

Some examples of materials suitable for the first and second dielectric layers 230, 235 are $LiNbO_3$, $Ta_2O_5$, and $BaTiO_3$. For example, bulk $BaTiO_3$, has microwave dielectric constant of 2200. In thin films, the microwave dielectric constant of $BaTiO_3$ reduces to about 200. $BaTiO_3$, has an index of refraction of about 2.3 for an operating wavelength of 1.55 μm. An index of refraction of 2.3 is low enough to provide rapidly decaying optical mode in the dielectric layers 230, 235. For an optical wavelength of 1.55 μm, the dielectric layers 230, 235 may be 0.6 μm thick to confine the mode such that optical mode does not overlap with the first and second metal conductors 250, 255. The index of refraction of $LiNbO_3$ is about 2.2 at an optical wavelength of 1.55 microns and the microwave dielectric constant of thin film $LiNbO_3$ is about 35.

Figure 3A:
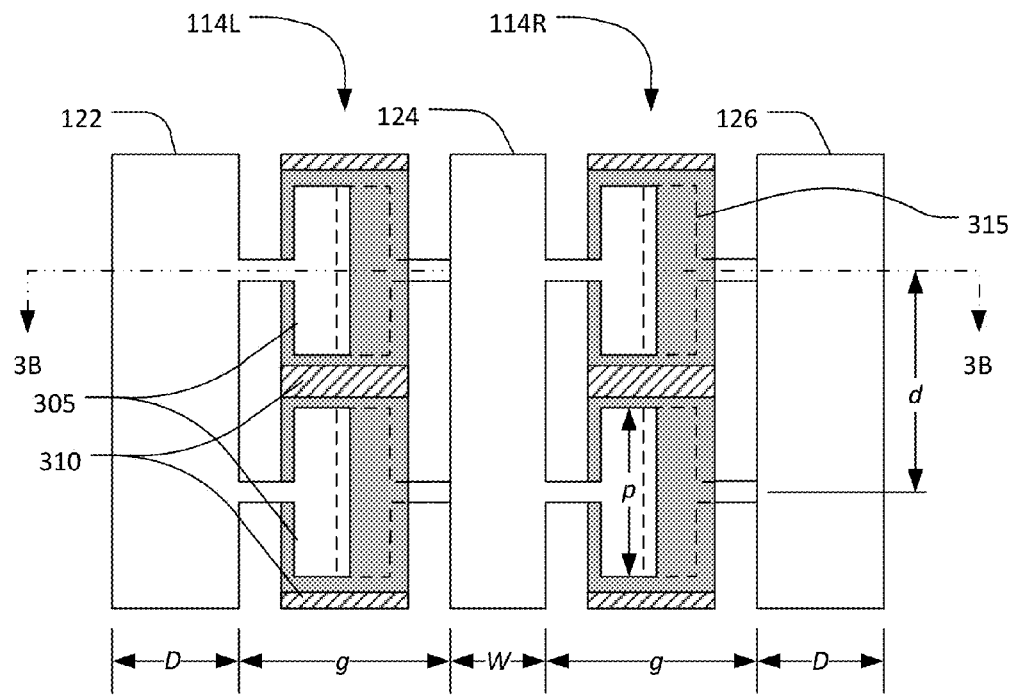
FIG. 3A is a plan view of a portion of the electro-optic modulator.
Figure 3B:
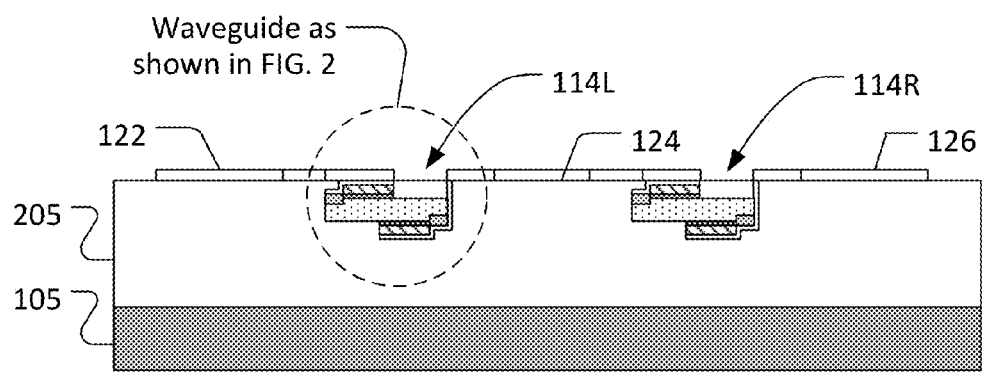
FIG. 3B is a cross-sectional schematic view of the electro-optic modulator.

A top schematic view of a portion of the ultra-wide bandwidth very-low drive voltage modulator 100 is shown in FIG. 3A and a cross-sectional schematic view of the same portion is shown in FIG. 3B. In FIGS. 3A and 3B branches are connected in parallel between signal and ground traces. They can also be connected in series. This arrangement may require a coplanar strip rather than a coplanar transmission line.

As shown in FIGS. 3A and 3B, two optical waveguides 114L, 114R formed in the substrate removed semiconductor layer are positioned adjacent to the gaps between the signal electrode 124 and ground electrodes 122, 126 of a coplanar transmission line. The designators "L" and "R" refer to the left-hand and right-hand waveguides as shown in this drawing and have no other physical meaning. Short stubs extending from the signal electrode 124 and ground electrodes 122, 126 connect to modulator electrodes 305 that overlap the optical waveguides 114. Note that modulator electrodes 315 shown as dashed lines are located beneath the optical waveguides 114L, 114R. Modulator electrodes extending from the ground electrode 122 are disposed on top of the left-hand optical waveguide 114L. Modulator electrodes extending from the signal electrode 124 are disposed beneath the left-hand optical waveguide 114L and on top of the right-hand optical waveguide 114R. Modulator electrodes extending from the ground electrode 126 are disposed beneath the right-hand optical waveguide 114R.

The waveguides optical waveguides, 114R are periodically implanted to form short semi-insulating sections 310. The implant material may be boron, protons, oxygen or any other suitable material. These semi-insulating sections 310 provide electrical isolation between adjacent modulator electrodes 305, 315. These semi-insulating sections 310 ensure that currents cannot flow through the p-doped and n-doped layers 220, 225 along the length of the modulator. Hence these short modulator electrodes 305, 315 and the interposed lengths of (not implanted) p-i-n diode formed by the optical waveguides 114L, 114R form small capacitive elements that periodically load the coplanar transmission line, increasing its capacitance per unit length. The modulator electrodes 305, 315 may be configured to adjust the capacitance per unit length of the coplanar transmission line to equalize the group velocity of the coplanar transmission line and the optical waveguides 114L, 114R.

Figure 4A:
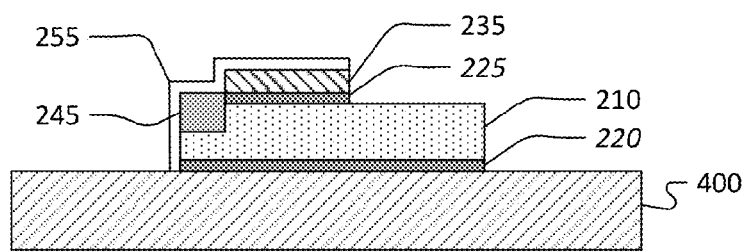
FIGS. 4A, 4B, 4C, and 4D are cross-sectional views of one optical waveguide of the electro-optic modulator illustrating an exemplary fabrication process.
Figure 4B:
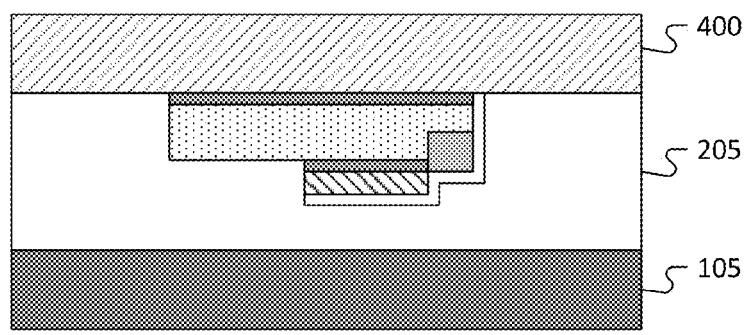
Figure 4C:
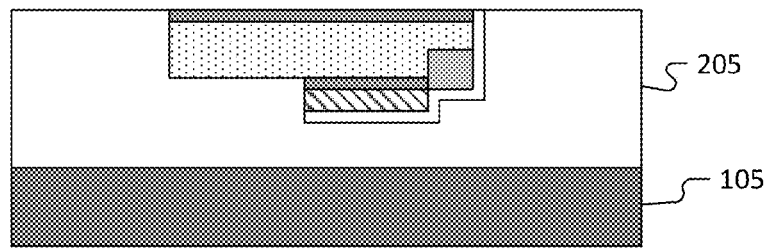
Figure 4D:
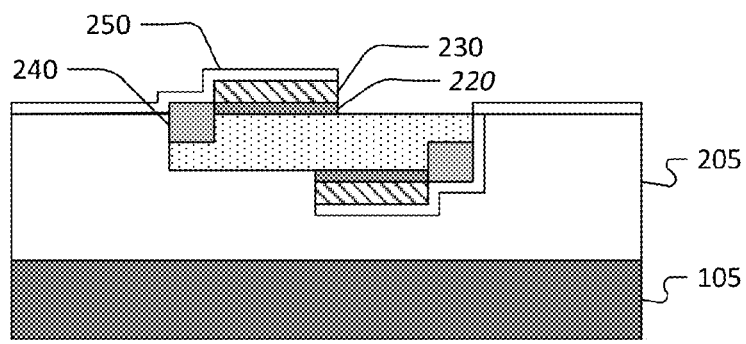

FIGS. 4A, 4B, 4C, and 4D illustrate a simplified process for fabricating a modulator, such as the ultra-wide bandwidth very low drive voltage modulator 100. As shown in FIG. 4A, the p-doped layer 220, the central i-layer 210, and the n-doped layer 225 may be sequentially grown on the surface of a compound semiconductor substrate 400. Subsequently, the semiconductors layers 220, 210, 225 may be patterned, and the second ohmic contract 245, the second dielectric layer 235, and the second metal conductor 255 may be formed. The p-doped layer 220 may be selectively implanted to form semi-insulating sections as previously described (not shown). The compound semiconductor substrate 400 may then be bonded face down to a semi-insulating GaAs or InP (or any other optically flat and insulating material) substrate 105 using adhesive 205, as shown in FIG. 4B. The adhesive 205 may be, for example, BCB or another polymer material. The original compound semiconductor substrate 400 may then be removed using, for example, a selective wet or dry etch process, the result of which is shown in FIG. 4C. Finally, as shown in FIG. 4D, the upper layers of the optical waveguides and the coplanar transmission line may be formed. These layers include the first dielectric layer 230, the first ohmic contact 240, and the first conductor 250.

When a microwave signal propagates along the coplanar transmission line 120 of the ultra-wide bandwidth very-low drive voltage modulator 100, there will be index changes in the substrate removed compound semiconductor layer due to linear electro-optic (LEO), quadratic electro-optic (QEO) and free carrier (FC) effects. The resultant differential phase shift between the arms of the interferometer is proportional to the difference of the index changes in each arm. During the operation, arms of the interferometer are biased such that the same DC bias resulting in a bias field of $E_B$ exists across each p-i-n diode in each arm. But the polarity of the AC field is changed between the arms due to physical electrode connection shown in FIG. 3B. Hence same magnitude and opposite direction AC fields of $E_{AC}$ exist in each arm. As a result, biasing electric field across the arms are $E_B + E_{AC}$ and $E_B - E_{AC}$. Then $$\Delta n_{LEO} = \frac{1}{2}\frac{n_m^4}{n_e} r_{41} 2E_{AC} \Gamma_{LEO}, \Delta n_{QEO} = \frac{1}{2}\frac{n_m^4}{n_e} R 4 E_{Bias} \Gamma_{QEO} E_{AC} \text{ and}$$

$$\Delta n_{FC} = K_N \Delta N^x \Gamma_N + K_P \Delta P^y \Gamma_P$$

where $n_m$ is the material index, $n_e$ is the effective index of the mode, $r_{41}$ is the LEO coefficient, R is the QEO coefficient, $\Gamma_{LEO}$ and $\Gamma_{QEO}$ are the overlap factors of the optical mode with the electric fields appropriate for the LEO and QEO effects, $\Gamma_N$ and $\Gamma_P$ are the overlap factors of the optical mode with the depleted n and p layers and $K_N$, $K_P$, x and y are the appropriate parameters for a given material. The index change needed to create a π phase shift between the arms of the modulator is $\Delta n_{NET} = \lambda/(2LF)$, where L is the length of the arms (see FIG. 1) and F is the fill factor. F arises since modulator arms are segmented using ion implantation due to high speed considerations and only a certain fraction of the electrode is active. In this case F=p/d. Furthermore $E_B = V_{Bias}/t$ and $E_{AC} = V_{AC}/t$. The reason why $E_{AC}$ depends on the thickness t of the MQW and not on the separation between the top and bottom metal electrodes is a key feature of the ultra-wide bandwidth very low drive voltage modulator and is explained in the next section. Substrate removal enables very small t values while keeping the overlap factors $\Gamma_{LEO}$ and $\Gamma_{QEO}$ high due to very high vertical optical confinement. Furthermore optical propagation loss is also low hence a reasonably long device can be fabricated. Calculations indicate that a 3 mm long device with a 45% fill factor and 0.3 µm thick MQW i-region has a $V_\pi$ of 0.4 V. Recent experimental results gave $V_\pi$ of 0.2 V for a 3 mm long device with 100% fill factor supporting this calculation (Selim Dogru and Nadir Dagli, "0.2 V Drive Voltage Substrate Removed Electro-Optic Mach-Zehnder Modulators with MQW cores at 1.55 µm, "IEEE/OSA J. of Lightwave Technology, vol. LT-32, NO. 3, pp. 435-439, Feb. 1, 2014).

Figure 5:
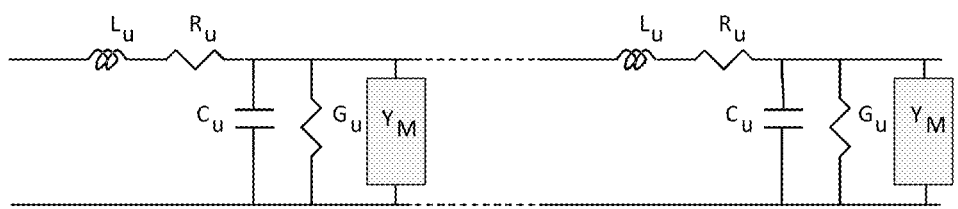
FIG. 5 is an electrical equivalent circuit of a coplanar waveguide.

The bandwidth of the ultra-wide bandwidth very low drive voltage modulator 100 may be determined by the microwave and millimeter wave characteristics of the coplanar transmission line. In traveling wave operation, widest bandwidth is obtained when optical and microwave group velocities are matched. The coplanar transmission line should not have any dispersion or its group and phase velocities should be the same. Even under perfect velocity matching, 3-dB bandwidth is reached when electrode loss becomes 6.4 dB. An electrical equivalent circuit of the coplanar transmission line is as shown in FIG. 5. Here $L_u$, $C_u$, $R_u$ and $G_u$ are the inductance, capacitance, resistance and conductance per unit length of the unloaded coplanar line. This coplanar transmission line is periodically loaded by electrically isolated modulator sections having admittance $Y_M$ and the accurate modeling of these sections is essential.

Figure 6:
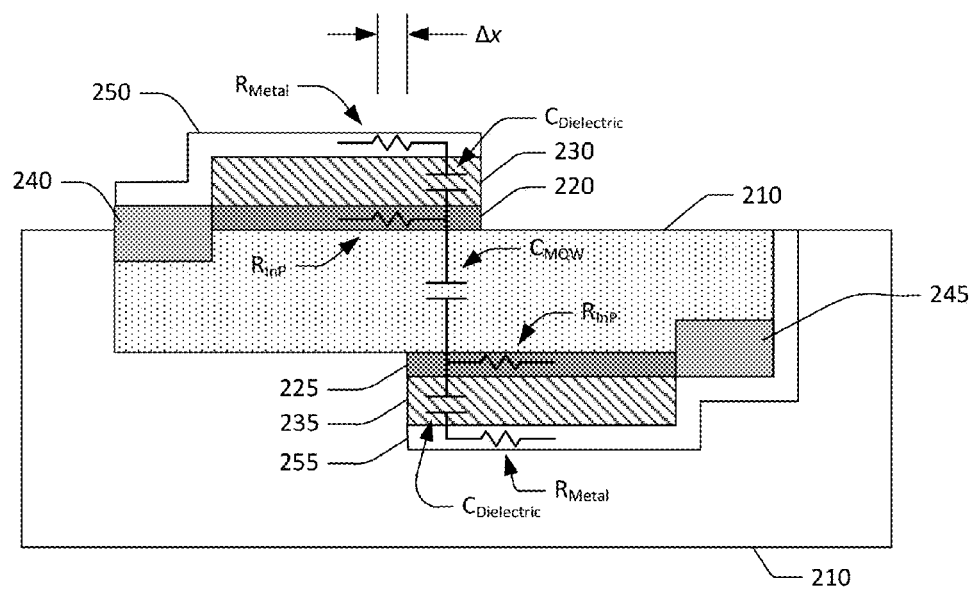
FIG. 6 is a cross-sectional schematic view of one optical waveguide of the electro-optic modulator showing equivalent circuit elements.
Figure 7:
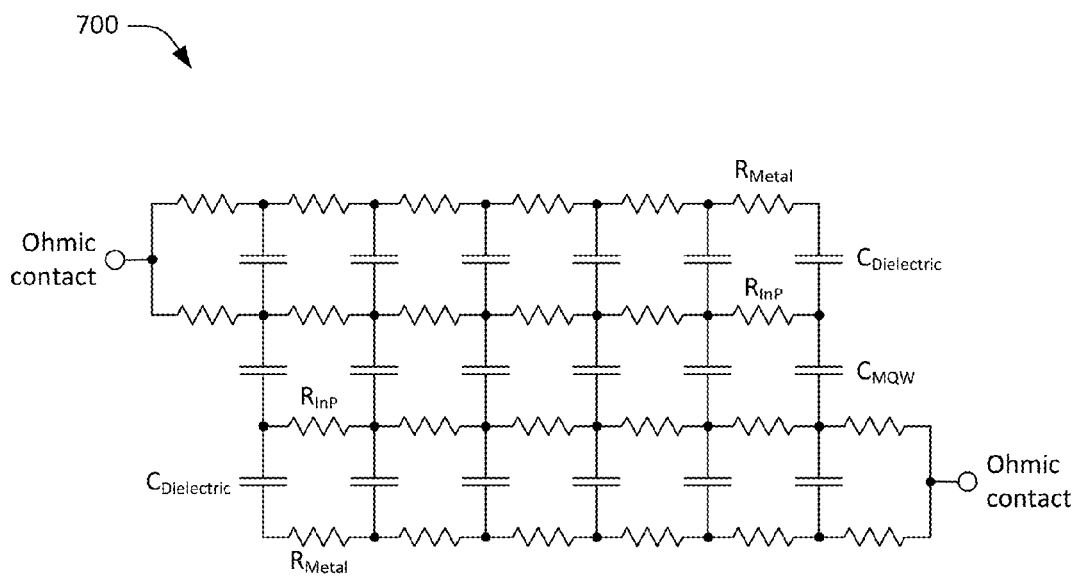
FIG. 7 is an electrical equivalent circuit of a portion of the electro-optic modulator.

A model of the modulator sections can be developed as shown in FIG. 6 and the equivalent circuit shown in FIG. 7. Each modulator section is about 100 µm long. So it can be modeled using lumped equivalent circuit elements. We take slices of Δx wide in the cross section and model each slice using appropriate resistance and capacitance per unit width of each slice. $R_{Metal}$ is the resistance per unit width of the first and second conductors 250, 255. $R_{InP}$ is the resistance per unit width of the p-doped layer 220 and the n-doped layer 225. $C_{Dielectric}$ is the capacitance per unit width of the first and second dielectric layers 230, 235. $C_{MQW}$ is the capacitance per unit width of the central i-layer 210. In this circuit $R_{Metal} \ll R_{InP}$ and $C_{Dielectric} \gg C_{MQW}$ due to very low sheet resistance of the metal and very high dielectric constant of the dielectric. At DC and low frequencies an external voltage applied to the ohmic contacts 240, 245 is applied across the central i-layer 210 through the p-doped layer 220 and the n-doped layer 225 that act as buried electrodes. Due to finite sheet resistance of the p-doped layer 220 and the n-doped layer 225, ohmic losses arise, increasing the microwave loss of the electrode. This loss will eventually limit the bandwidth. However as frequency increases, impedance of $C_{Dielectric}$ is very low, effectively connecting the ohmic contacts 240, 245 to the p-doped layer 220 and the n-doped layer 225 through very low impedance $R_{Metal}$ and $C_{Dielectric}$. Hence the external voltage appears across the central i-layer 210 uniformly and the current flow in the p-doped layer 220 and the n-doped layer 225 is significantly limited. Therefore losses arising from these doped buried electrodes are reduced significantly. This in turn enhances the bandwidth drastically.

Figure 8A:
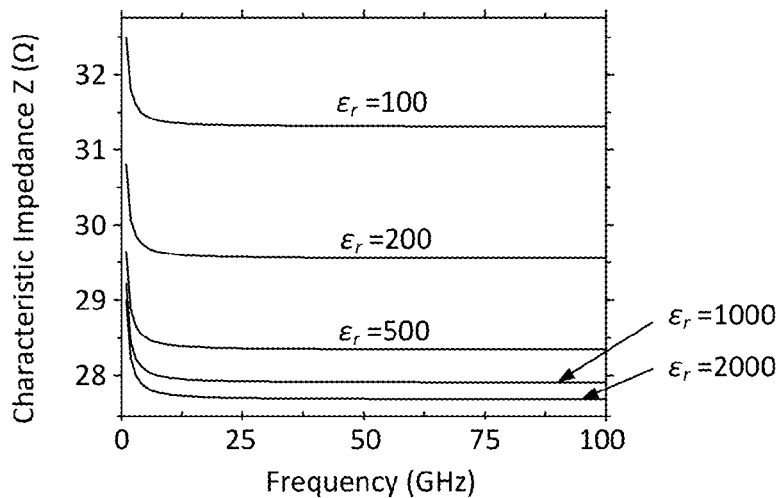
FIGS. 8A, 8B, and 8C are graphs showing the simulated performance of the electro-optic modulator Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having the same reference designator.
Figure 8B:
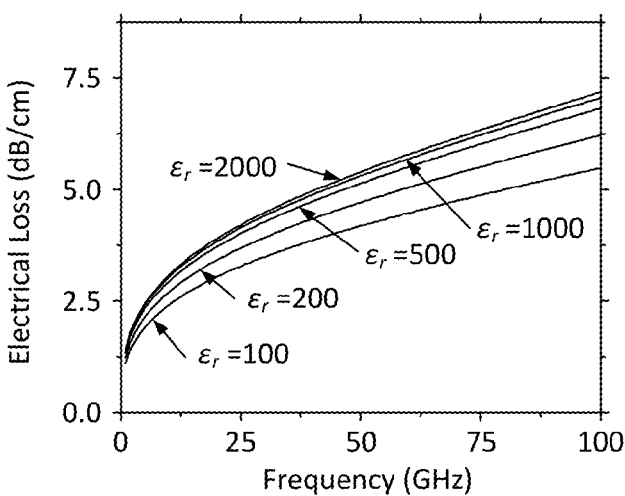
Figure 8C:
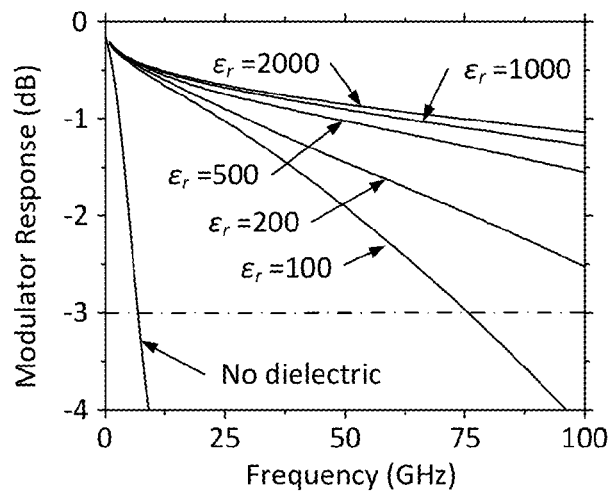

Modulator electrode characteristics and modulation response were calculated using the equivalent circuits shown in FIG. 5 and FIG. 7. For unloaded line modeling, existing empirical formulas are used. In the simulations, W=100 µm, g=25 µm and the BCB is 10 µm thick. FIGS. 8A, 8B, and 8C respectively show the characteristic impedance, $Z_c$, and attenuation coefficient, α, of the electrode as well as the modulation response of the modulator up to 100 GHz for different relative dielectric constants, $\in_r$, of the dielectric. α and $Z_c$ show mild dependence on $\in_r$. A tenfold increase in $\in_r$ changes these quantities by about 10% and most of the change takes place when $\in_r \leq 200$. Hence there is no need to obtain extremely large $\in_r$ values. Modulation bandwidth exceeds 100 GHz for $\in_r$ greater than about 150, demonstrating the ultra-wide bandwidth of this design with very low drive voltage. FIG. 8C also shows the result of a simulation without the dielectric and metal layers. In this case bandwidth is about 5 GHz. The techniques described herein improve the bandwidth more than 15 times.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An electro-optical modulator comprising:
   a Mach-Zehnder interferometer formed in a substrate removed semiconductor layer; and
   a coplanar waveguide, wherein
   signals from the coplanar waveguide are capacitively coupled to the Mach-Zehnder interferometer through first and second dielectric layers having strong dielectric constant dispersion.

2. The electro-optical modulator of claim 1, wherein the dielectric layers have an index of refraction less than or equal to 3.1 at a predetermined wavelength of operation of the Mach-Zehnder interferometer.

3. The electro-optical modulator of claim 1, wherein the dielectric layers have relative dielectric constant greater than or equal to 100 at a predetermined modulation frequency.

4. The electro-optical modulator of claim 1, wherein the Mach-Zehnder interferometer further comprises:
   an input waveguide, a waveguide splitter, two branch waveguides, a waveguide combiner, and an output waveguide, wherein
   each waveguide element comprises an intrinsic bulk or multi quantum well structure (i-MQW) sandwiched between n-doped and p-doped semiconductor layers.

5. The electro-optical modulator of claim 4, wherein
   the first dielectric layer is disposed on the n-doped semiconductor layer along at least a portion of at least one of the branch waveguides, and
   the second dielectric layer is disposed on the p-doped semiconductor layer along the portion of the at least one of the branch waveguides.

6. The electro-optical modulator of claim 5, further comprising:
   a first conductor overlaying the first dielectric layer along the portion of the at least one of the branch waveguides, the first metal layer connected to a ground conductor of the coplanar waveguide; and
   a second conductor overlaying the second dielectric layer along the portion of the at least one of the branch waveguides, the second metal layer connected to a signal conductor of the coplanar waveguide.

7. The electro-optical modulator of claim 6, wherein
   a thickness of the first dielectric layer and the second dielectric layer is sufficient to prevent an optical mode propagating in a branch waveguide from overlapping the first metal layer and the second metal layer, respectively.

8. The electro-optical modulator of claim 6, further comprising:
   a first ohmic contact connecting the first metal layer to the n-doped semiconductor layer along the portion of the at least one of the branch waveguides; and
   a second ohmic contact connecting the second metal layer to the p-doped semiconductor layer along the portion of the at least one of the branch waveguides.

9. The electro-optical modulator of claim 4, wherein
   the i-MQW comprises InGaAlAs, and
   the n-doped and p-doped semiconductor layers comprise n-InP and p-InP, respectively.

10. The electro-optical modulator of claim 1, wherein the first and second dielectric layers comprise one of $LiNbO_3$, $Ta_2O_5$, and $BaTiO_3$.

11. A method of fabricating an electro-optical modulator comprising:
    forming a Mach-Zehnder interferometer in a substrate removed semiconductor layer; and
    forming a coplanar waveguide overlaying the Mach-Zehnder interferometer, wherein
    signals from the coplanar waveguide are capacitively coupled to the Mach-Zehnder interferometer through first and second dielectric layers having strong dielectric constant dispersion.

12. The method of fabricating an electro-optical modulator of claim 11, wherein the dielectric layers have an index of refraction less than or equal to 3.1 at a predetermined wavelength of operation of the Mach-Zehnder interferometer.

13. The method of fabricating an electro-optical modulator of claim 11, wherein the dielectric layers have relative dielectric constant greater than or equal to 35 at a predetermined modulation frequency.

14. The method of fabricating an electro-optical modulator of claim 11, wherein forming the Mach-Zehnder interferometer further comprises:
    forming an input waveguide, a waveguide splitter, two branch waveguides, a waveguide combiner, and an output waveguide, wherein
    each waveguide element comprises an intrinsic bulk or multi quantum well structure (i-MQW) sandwiched between n-doped and p-doped semiconductor layers.

15. The method of fabricating an electro-optical modulator of claim 14, further comprising:
    depositing the first dielectric layer on the n-doped semiconductor layer along at least a portion of at least one of the branch waveguides, and
    depositing the second dielectric layer on the p-doped semiconductor layer along the portion of the at least one of the branch waveguides.

16. The method of fabricating an electro-optical modulator of claim 15, further comprising:
    depositing a first conductor overlaying the first dielectric layer along the portion of the at least one of the branch waveguides, the first metal layer connected to a ground conductor of the coplanar waveguide; and
    depositing a second conductor overlaying the second dielectric layer along the portion of the at least one of the branch waveguides, the second metal layer connected to a signal conductor of the coplanar waveguide.

17. The method of fabricating an electro-optical modulator of claim 16, wherein a thickness of the first dielectric layer and the second dielectric layer is sufficient to prevent an optical mode propagating in a branch waveguide from overlapping the first metal layer and the second metal layer, respectively.

18. The method of fabricating an electro-optical modulator of claim 16, further comprising:
   forming a first ohmic contact to connect the first metal layer to the n-doped semiconductor layer along the portion of the at least one of the branch waveguides; and
   forming a second ohmic contact to connect the second metal layer to the p-doped semiconductor layer along the portion of the at least one of the branch waveguides.

19. The method of fabricating an electro-optical modulator of claim 14, wherein
   the i-MQW comprises InGaAlAs, and
   the n-doped and p-doped semiconductor layers comprise n-InP and p-InP, respectively.

20. The method of fabricating an electro-optical modulator of claim 11, wherein the first and second dielectric layers comprise one of $LiNbO_3$, $Ta_2O_5$, and $BaTiO_3$.

* * * * *